(12) United States Patent
Mitsugi et al.

(10) Patent No.: US 7,409,598 B2
(45) Date of Patent: Aug. 5, 2008

(54) INFORMATION STORAGE SYSTEM

(75) Inventors: Tatsuya Mitsugi, Tokyo (JP); Chikako Takeuchi, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 240 days.

(21) Appl. No.: 10/540,159

(22) PCT Filed: Oct. 27, 2004

(86) PCT No.: PCT/JP2004/015937

§ 371 (c)(1),
(2), (4) Date: Jun. 21, 2005

(87) PCT Pub. No.: WO2004/055231

PCT Pub. Date: Jun. 16, 2005

(65) Prior Publication Data

US 2006/0072233 A1     Apr. 6, 2006

(30) Foreign Application Priority Data

Dec. 5, 2003     (JP)     ............... 2003-406989

(51) Int. Cl.
*G06F 11/00* (2006.01)
(52) U.S. Cl. .............. 714/42; 714/6; 714/721; 714/723
(58) Field of Classification Search ............ 714/6, 714/42, 721, 723
See application file for complete search history.

(56) References Cited

U.S. PATENT DOCUMENTS

| | | | | |
|---|---|---|---|---|
| 5,088,081 A | * | 2/1992 | Farr | 369/47.14 |
| 5,493,676 A | * | 2/1996 | Amundson | 714/42 |
| 5,611,069 A | * | 3/1997 | Matoba | 711/114 |
| 5,872,800 A | * | 2/1999 | Glover et al. | 714/766 |
| 6,069,857 A | * | 5/2000 | Schell et al. | 369/53.28 |
| 6,154,858 A | * | 11/2000 | Ottesen et al. | 714/42 |
| 7,133,966 B2 | * | 11/2006 | Sato et al. | 711/114 |
| 7,181,578 B1 | * | 2/2007 | Guha et al. | 711/154 |
| 2002/0026549 A1 | * | 2/2002 | Powers et al. | 710/104 |
| 2005/0080990 A1 | * | 4/2005 | Mereddy et al. | 711/114 |
| 2006/0039252 A1 | * | 2/2006 | Chu | 369/44.32 |

FOREIGN PATENT DOCUMENTS

| | | |
|---|---|---|
| JP | 9-63203 A | 3/1997 |
| JP | 2002-132583 A | 5/2002 |
| JP | 3376364 B2 | 11/2002 |
| JP | 2003-297025 A | 10/2003 |
| JP | 2003-308663 A | 10/2003 |

* cited by examiner

*Primary Examiner*—Bryce P Bonzo
(74) *Attorney, Agent, or Firm*—Sughrue Mion, PLLC (57) ABSTRACT

A host device 1 includes an NG table 10 for storing addresses specifying areas of a bulk memory 3 into which data cannot be written, a performance-guaranteed environment determination means 11 for determining whether or not the current environment of the bulk memory 3 is outside a performance-guaranteed environment where the performance of the bulk memory 3 is guaranteed, and control means 12, 13, 14, and 15 for writing data in an area of the bulk memory which is specified by an address which is not stored in the NG table 10 when the performance-guaranteed environment determination means 11 determines that the current environment is outside the performance-guaranteed environment. Therefore, even if the current environment of the bulk memory is outside the performance-guaranteed environment, the host device can normally write data in the bulk memory, thereby improving the reliability of the system.

14 Claims, 9 Drawing Sheets

MEMORY REFERENCE ADDRESS TABLE

| A0 | A1 | A2 | A3 | A4 |
|---|---|---|---|---|
| ADDRESS P | ADDRESS 1000 | ADDRESS 2000 | ADDRESS 3000 | END MARK |

FIG.4

DATA-TO-BE-WRITTEN SIZE TABLE

| R0 | R1 | R2 | R3 | R4 |
|---|---|---|---|---|
| 4k BYTES | 4k BYTES | 4k BYTES | 4k BYTES | 0k BYTES |

FIG.5

NG TABLE

| ADDRESS 0 | ADDRESS 1000 | ADDRESS 2000 | ADDRESS 3000 | ADDRESS 4000 | ADDRESS 5000 |
|---|---|---|---|---|---|
| ○ | ○ | × | ○ | ○ | ○ |

FIG.6

AREA INTO WHICH
DATA ARE WRITTEN

AREA INTO WHICH DATA
CANNOT BE WRITTEN

OTHER DATA AREA

INFORMATION STORAGE SYSTEM

FIELD OF THE INVENTION

The present invention relates to an information storage system. More particularly, it relates to a technology for accessing data stored in a bulk memory, such as a hard disk, when the bulk memory is placed outside a performance-guaranteed environment where the performance of the bulk memory is guaranteed.

BACKGROUND OF THE INVENTION

Conventionally, when a defective area exists in a bulk memory disposed as an information storage medium, information about the defective area is stored in a part of the bulk memory, and, when access to the defective area occurs, access to the bulk memory is enabled or disabled with reference to the information.

As such a technology for accessing a bulk memory having defective areas, an information storage method of and an information storage apparatus for enabling stable continuous recording of information in an information storage medium even if many defective areas exist in the information storage medium, and a method of reproducing the information recorded in the information storage medium are known (refer to patent reference 1, for example). In accordance with this technology, information per file is recorded in the information storage medium, and a contiguous data area which is a continuous record area provided for reducing the frequency of access to an optical head and for making it possible to continuously record information in the information storage medium is defined. This contiguous data area is defined so as to extend over either of another file record area which is already recorded in the information storage medium, or a defective area on the information storage medium, and an extent is defined, as an information storage place, with respect to areas divided by the other file record area or the defective area on the information storage medium.

[Patent reference 1] Japanese Patent No. 3376364

By the way, for a bulk memory typified by a related art hard disk, a set of conditions, such as temperature, humidity, and vibrations, under which the manufacturer of the bulk memory guarantees the performance of the bulk memory, i.e., a performance-guaranteed environment is provided. Such a bulk memory has a function (called a smart function) of, when an error occurs while the bulk memory is placed in the performance-guaranteed environment, recording information about the error in a log area which is disposed within the bulk memory. Therefore, a host device connected to the bulk memory can know both the occurrence of any error and the status of the bulk memory when the error occurs by referring to the log area.

However, when the related art bulk memory is used outside the performance-guaranteed environment and an error occurs, any information about the error is not recorded in the log area of the bulk memory. Therefore, when the related art bulk memory is used outside the performance-guaranteed environment and an error occurs, the host device cannot know the fact.

On the other hand, in recent years, bulk memories have come to be adopted by systems, such as car-navigation systems, which are used under severe conditions, so as to provide improvements in the functionality and performance of the systems. In such a related art system, even if the system is placed outside a performance-guaranteed environment, there is a necessity to write data in the bulk memory. Generally, the bulk memory is designed so as to have a certain margin against writing of data when it is placed outside the performance-guaranteed environment, and therefore writing of data into the -bulk memory attains success in most cases even if the bulk memory is placed outside the performance-guaranteed environment.

A problem with the related art system is however that when data are written into the bulk memory which is placed outside the performance-guaranteed environment, if an error occurs, a host device connected to the bulk memory cannot know the occurrence of the error, and therefore cannot grasp whether the bulk memory is operating normally, thereby decreasing the reliability of the system.

The present invention is made in order to solve the above-mentioned problem, and it is therefore an object of the present invention to provide an information storage system that can write data in a bulk memory normally and can increase its reliability even if it is placed outside a performance-guaranteed environment.

DISCLOSURE OF THE INVENTION

An information storage system in accordance with the present invention is provided with a host device for controlling writing of data into a bulk memory, the host device including: an NG table for storing addresses specifying areas of the bulk memory into which data cannot be written; a performance-guaranteed environment determination means for determining whether or not a current environment of the bulk memory is outside a performance-guaranteed environment in which performance of the bulk memory is guaranteed; and a control means for writing data in an area of the bulk memory specified by an address which is not stored in the NG table when the performance-guaranteed environment determination means determines that the current environment is outside the performance-guaranteed environment.

The control means of the information storage system in accordance with the present invention can include an address acquisition means for acquiring the address of the bulk memory which is not stored in the NG table when the performance-guaranteed environment determination means determines that the current environment of the bulk memory is outside the performance-guaranteed environment, a data acquisition means for acquiring the data which are to be written into the bulk memory, a data writing means for writing the data acquired by the data acquisition means into the area of the bulk memory which is specified by the address acquired by the address acquisition means, and a verification checking means for comparing the data which have been written into the area by the data writing means with the data acquired by the data acquisition means, and for writing the address acquired by the address acquisition means in the NG table when determining that the data which have been written into the area does not match the data acquired by the data acquisition means.

In accordance with the present invention, the information storage system includes the NG table disposed in the host device, for storing the addresses of areas where data cannot be written, and, when performing writing of data into the bulk memory which is placed outside the performance-guaranteed environment, writes the data in an area specified by an address other than the addresses of the areas where data cannot be written with reference to the NG table. Therefore, the host device can write the data in the bulk memory normally even if the current environment of the bulk memory is outside the performance-guaranteed environment, and therefore the reliability of the information storage system can be improved.

Furthermore, in accordance with the present invention, the control means compares the data which have been written into the bulk memory with the data acquired from the bulk memory and, when the data which have been written into the bulk memory do not match with the data acquired from the bulk memory, updates the NG table by writing the address of the bulk memory into which the data have been written into the NG table. Therefore, the information storage system can normally write data into the bulk memory at all times.

PREFERRED EMBODIMENTS OF THE INVENTION

Hereafter, in order to explain this invention in greater detail, the preferred embodiments of the present invention will be described with reference to the accompanying drawings. Embodiment 1.

Figure 1:
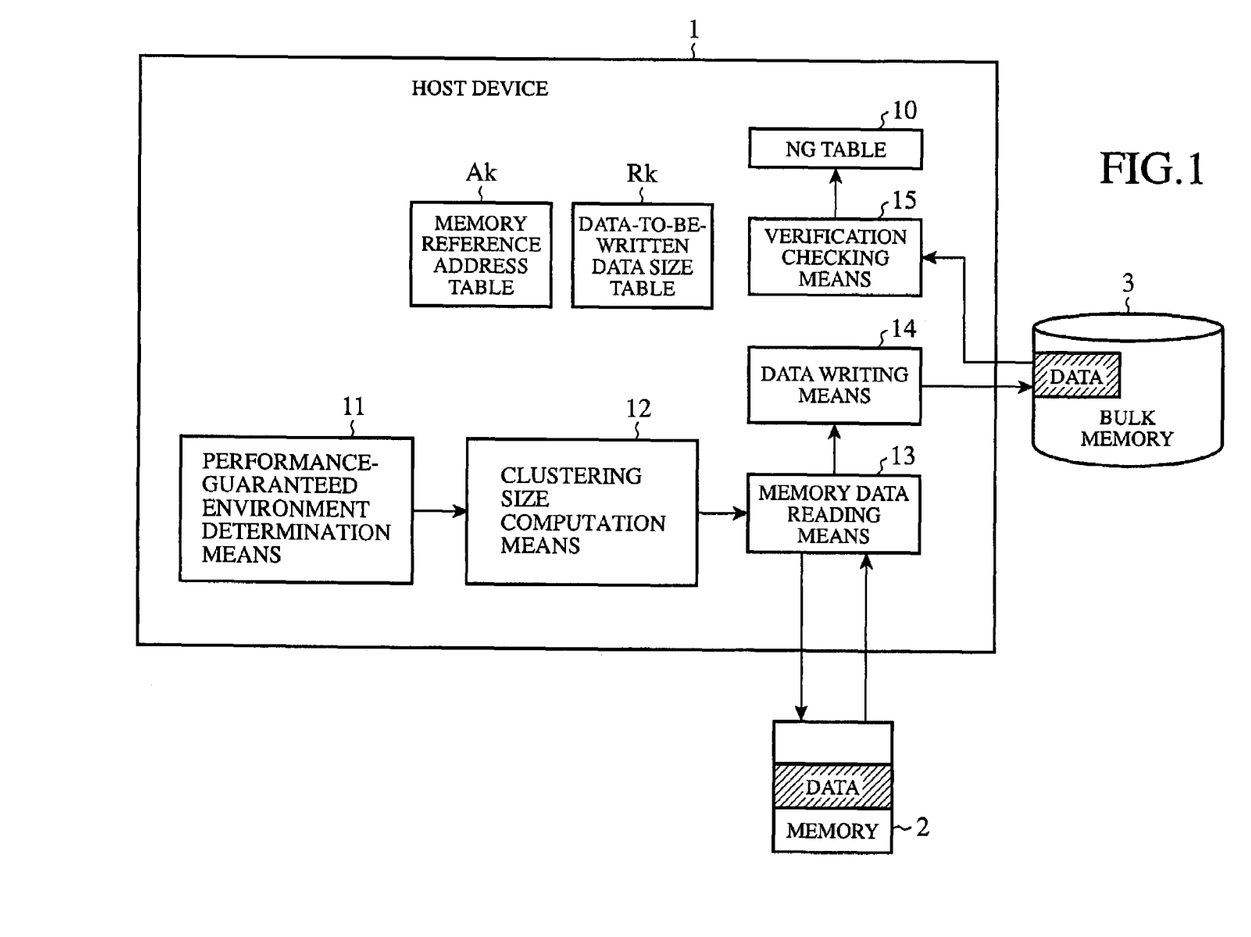
FIG. 1 is a block diagram showing the structure of the whole of an information storage system in accordance with embodiment 1 of the present invention.

FIG. 1 is a block diagram showing the structure of the whole of an information storage system in accordance with embodiment 1 of the present invention. This information storage system is provided with a host device 1, a memory 2, and a bulk memory 3.

The host device 1 includes a microcomputer, for example, and controls the whole of the information storage system. The detailed structure and operation of this host device 1 will be mentioned later.

Figure 2:
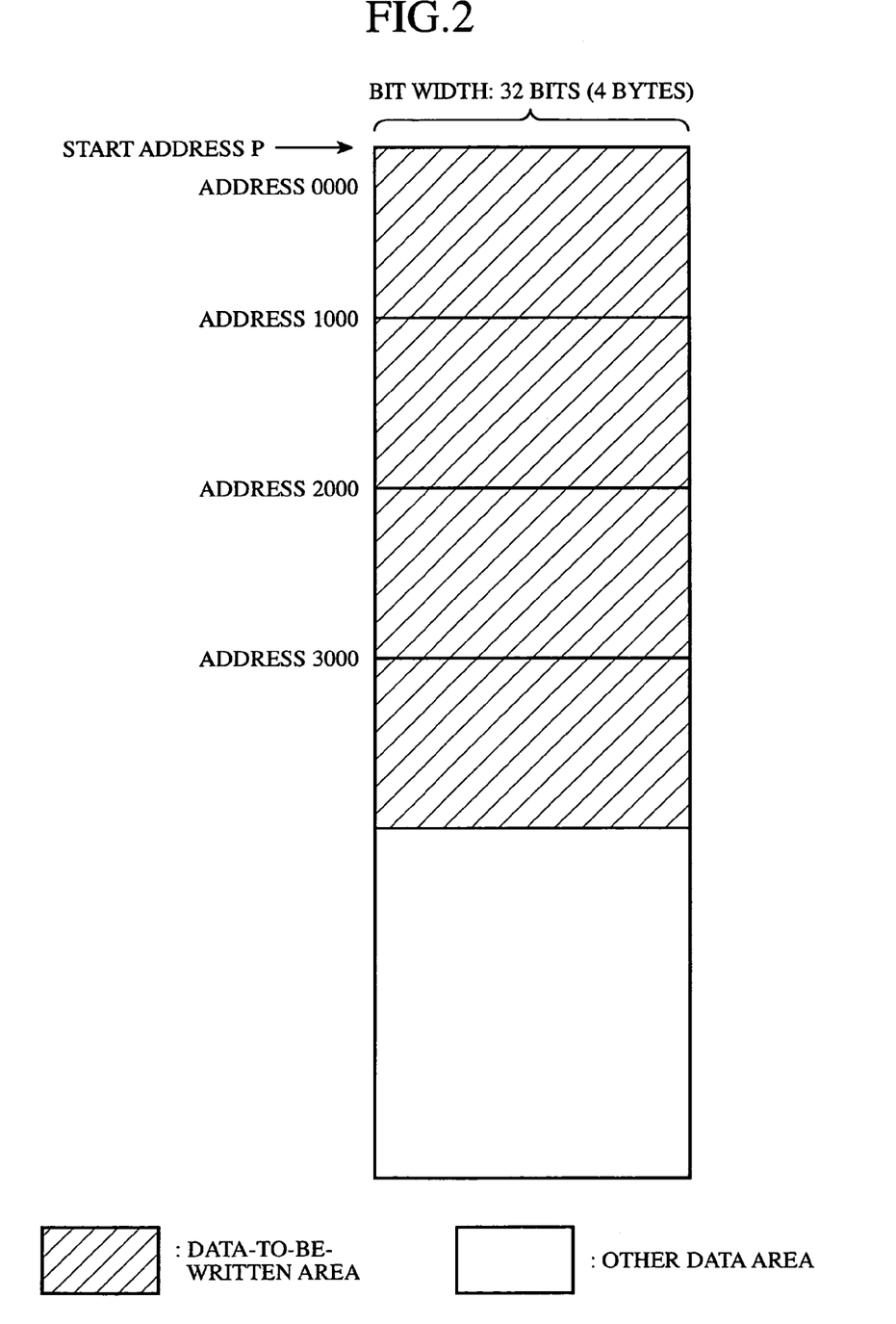
FIG. 2 is a diagram showing a state in which data which are to be written into a bulk memory are stored in a memory of the information storage system in accordance with embodiment 1 of the present invention.

The memory 2 is used to temporarily store data which the host device 1 will use when carrying out various processes. FIG. 2 shows a state in which data which are to be written into the bulk memory 3 are stored in the memory 2. In other words, this figure shows an arrangement of the data to be written in the memory 2 in a case where the start address P of the data to be written is 0000, the size D of a data area in which the data are to be written is 16 Kbytes, and an optimal cluster size S is 4 Kbytes. In accordance with this embodiment 1, it is assumed that 1 word consists of 32 bits (i.e., 4 bytes) and an address is assigned to each byte. It is also assumed that an address is defined in hexadecimal.

When the size D of the data area in which the data are to be written is 16 Kbytes, the data area in which the data are to be written consists of the following four cluster areas: an area of 4 Kbytes which begins from the address 0000, an area of 4 Kbytes which begins from an address 1000, an area of 4 Kbytes which begins from an address 2000, and an area of 4 Kbytes which begins from an address 3000, if the optimal cluster size S is 4 Kbytes.

Figure 3:
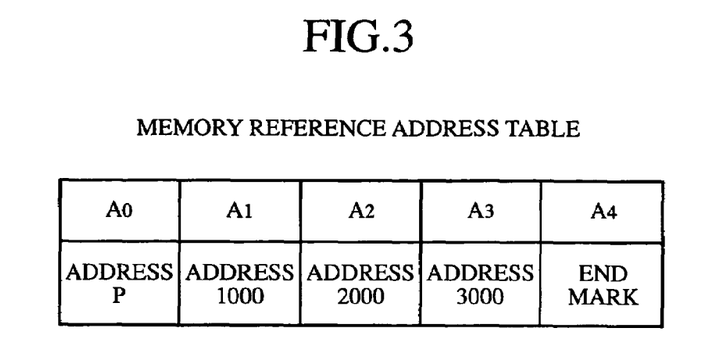
FIG. 3 is a diagram showing the structure of a memory reference address table disposed within a host device of the information storage system in accordance with embodiment 1 of the present invention.

FIG. 3 shows the structure of a memory reference address table Ak (k=0, 1, 2, . . . , n−1, n) disposed within the host device 1. "k" which is the suffix of Ak shows a cluster number given to each cluster, and "n" is a quotient obtained by dividing the size D of the data area in which the data are to be written by the optimal cluster size S, and the same suffixes which will be mentioned below have the same meanings.

FIGS. 2 and 3 show an example in which n=16/4=4. When the optimal cluster size S is 4 Kbytes, the address 0000 which is the start address of a cluster 0 (which is equal to the start address P of the data to be written) is stored in A0 of the memory reference address table Ak, the address 1000 which is the start address of a cluster 1 is stored in A1 of the memory reference address table Ak, the address 2000 which is the start address of a cluster 2 is stored in A2 of the memory reference address table Ak, the address 3000 which is the start address of a cluster 3 is stored in A3 of the memory reference address table Ak, and an END mark is stored in An which is the last element of the memory reference address table Ak.

Figure 4:
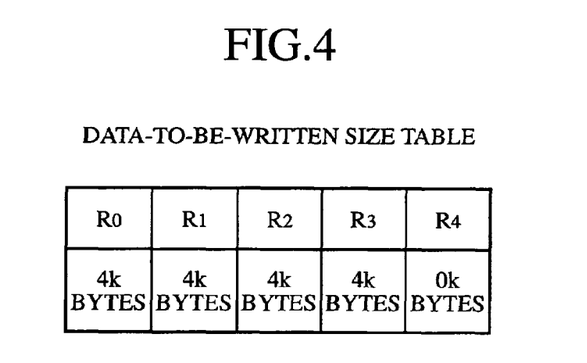
FIG. 4 is a diagram showing the structure of a data size table disposed within the host device of the information storage system in accordance with embodiment 1 of the present invention.

FIG. 4 shows the structure of a data-to-be-written size table Rk (k=0, 1, 2, . . . , n−1, n) disposed within the host device 1. When the size D of the data area in which the data are to be written is 16 Kbytes, the size of data to be stored in each of R0, R1, R2, and R3 is 4 Kbytes which is equal to the optimal cluster size S if n is 4. Rn which is the last element of the data-to-be-written size table Rk is a remainder obtained by dividing the size D of the data area in which the data are to be written by the optimal cluster size S, and has a size of 0 Kbytes in this case.

Figure 5:
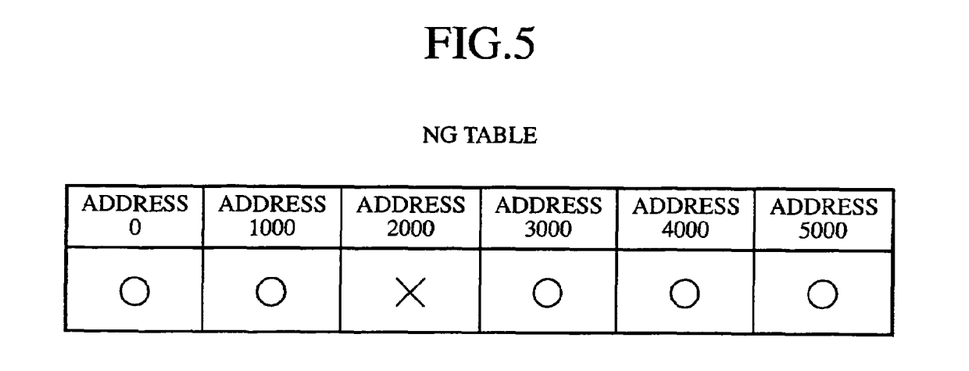
FIG. 5 is a diagram showing the structure of an NG table disposed within the host device of the information storage system in accordance with embodiment 1 of the present invention.

FIG. 5 shows the structure of an NG table 10 disposed within the host device 1. The NG table 10 stores information showing whether or not data can be written into each cluster area of the bulk memory 3 which is determined based on the optimal cluster size S. In an initial state, a mark O indicating a state in which data can be written is written into all the cluster areas of this NG table 10. When determining by performing processing which will be mentioned below that any data cannot be written into a cluster area, the host device replaces the mark O written into this cluster area with a mark x indicating a state in which any data cannot be written into the cluster area. FIG. 5 shows an example in which the mark x indicating a state in which any data cannot be written is stored in only the cluster area which begins from the address 2000.

Figure 6:
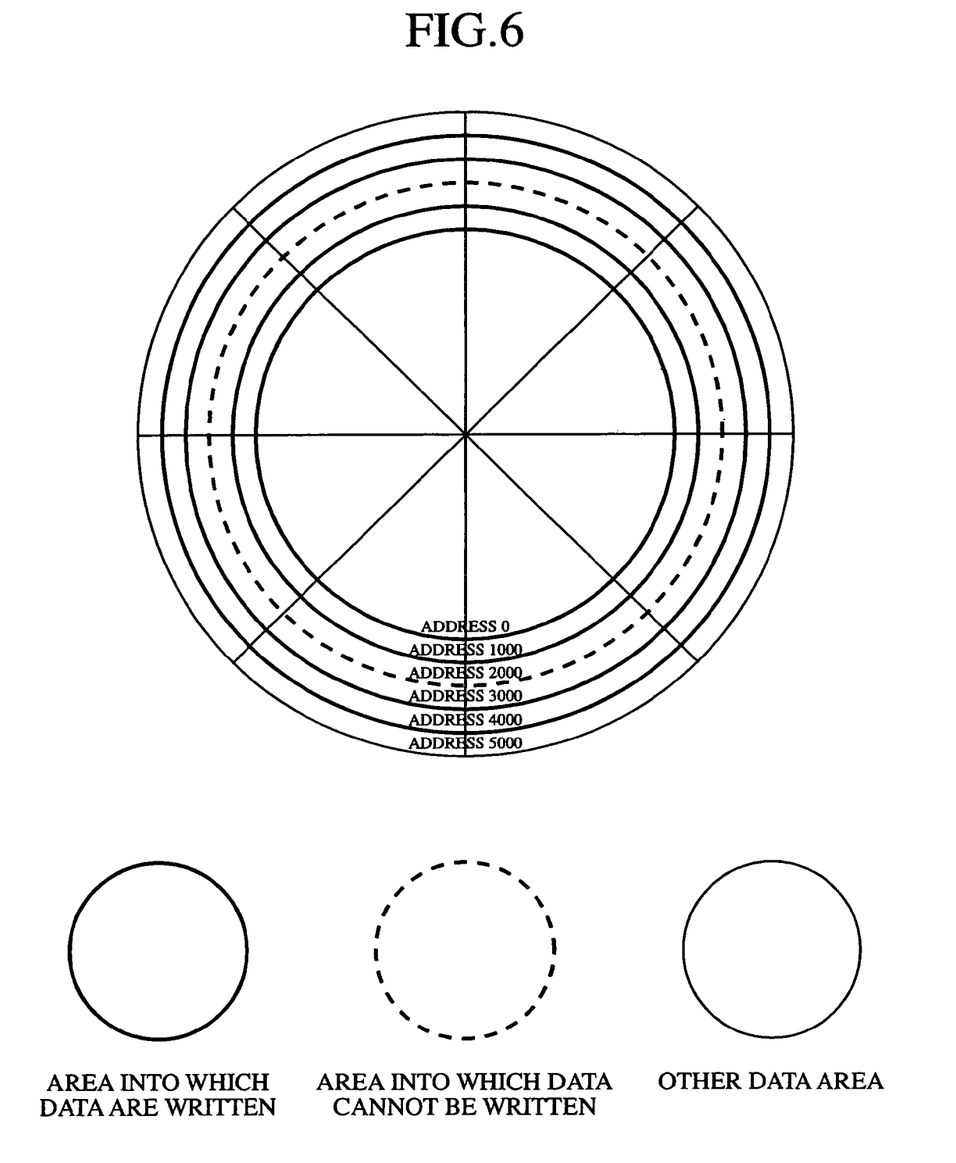
FIG. 6 is a diagram schematically showing a status of the bulk memory of the information storage system in accordance with embodiment 1 of the present invention, into which data have been written completely.

The bulk memory 3 consists of a hard disk (HDD), a CD (Compact Disc), a DVD (Digital Versatile Disk), or the like, for example. FIG. 6 is a diagram schematically showing the structure of the bulk memory 3. For the sake of simplicity, the structure of the bulk memory 3 is schematically illustrated in this figure. In other words, this bulk memory 3 includes two or more trucks, and each of the two r more trucks is divided into 8 sectors. Each of the two or more trucks corresponds to one cluster (4 Kbytes).

In addition to the memory reference table Ak, data size table Rk, and NG table 10, which are mentioned above, the host device 1 includes a performance-guaranteed environment determination means 11, a clustering size computation means 12, a memory data reading means 13, a data writing means 14, and a verification checking means 15. A control means of the present invention is provided with the clustering size computation means 12, memory data reading means 13, data writing means 14, and verification checking means 15.

The performance-guaranteed environment determination means 11 determines whether or not a current environment of the bulk memory 3 is outside a performance-guaranteed environment where the performance of the bulk memory 3 is guaranteed by the manufacturer of the bulk memory. To be more specific, the performance-guaranteed environment determination means 11 receives signals from various sensors, such as a temperature sensor, a humidity sensor, and a G (acceleration) sensor not shown, and determines whether values shown by these signals indicate that the current environment is outside the performance-guaranteed environment. The determination results obtained by the performance-guaranteed environment determination means 11 are delivered to the clustering size computation means 12 as a cluster event.

The clustering size computation means 12 corresponds to an address acquisition means of the present invention, and carries out processing associated with the cluster event. This clustering size computation means 12 carries out calculation of the optimal cluster size S, creation of the data-to-be-written size table Rk, and creation of the memory reference address table Ak, and generates a read request event based on these processes, as will be mentioned below in detail. The read request event generated by the clustering size computation means 12 is delivered to the memory data reading means 13.

The memory data reading means 13 corresponds to a data acquisition means of the present invention, and carries out processing associated with the read request event. This memory data reading means 13 reads the data to be written from the memory 2 in response to the read request event generated by the clustering size computation means 12, and, after that, generates a write request event by which it makes a request for writing of the data into the bulk memory 3, as will be mentioned below in detail. This write request event generated by the memory data reading means 13 is then delivered to the data writing means 14.

The data writing means 14 carries out processing associated with the write request event. The data writing means 14 writes the data read by the memory data reading means 13 into the bulk memory 3 in response to the write request event generated by the memory data reading means 13, and, after that, generates a verification event, as will be mentioned below in detail. This verification event generated by the data writing means 14 is then delivered to the verification checking means 15.

The verification checking means 15 carries out processing associated with the verification event. The verification checking means 15 reads the data written into the bulk memory 3 by the data writing means 14 in response to the verification event generated by the data writing means 14, and performs a verification check on the data. When then determining that the data which have been written into the bulk memory 3 do not match the corresponding data which are yet-to-be written into the bulk memory 3, the verification checking means generates a write event again. This write event generated by the verification checking means 15 is delivered to the data writing means 14 again, and the data writing means 14 retries the writing of the data into the bulk memory. When the number of times that the writing of the data into the bulk memory is retried exceeds an NG write permissible number-of-times N, the verification checking means generates an error event.

Next, the operation of the information storage system in accordance with embodiment 1 of the present invention which is so constructed as mentioned above will be explained with reference to flow charts shown in FIGS. 7 to 13. Assume that this information storage system uses an event-triggering method, and starts each processing when a corresponding event occurs.

Figure 7:
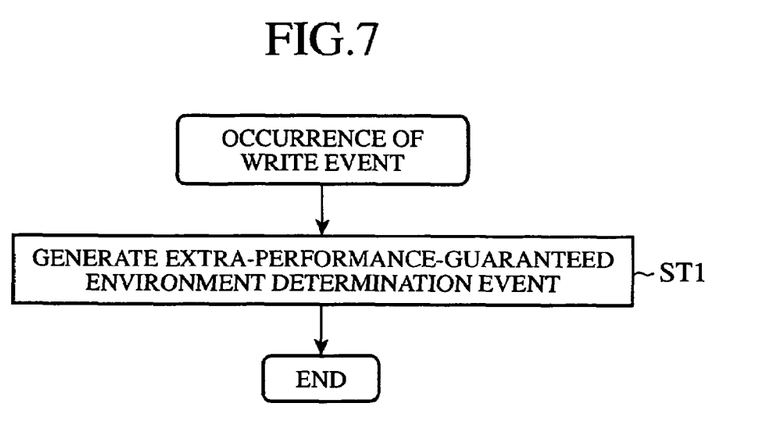
FIG. 7 is a flow chart showing processing which is carried out by the information storage system in accordance with embodiment 1 of the present invention when an event for writing data into the bulk memory occurs.

FIG. 7 is a flow chart showing processing which is carried out by the information storage system when an event for writing data stored in the memory 2 into the bulk memory 3 occurs. When an application program not shown generates an event for writing data stored in the memory 2 into the bulk memory 3, the host device 1 generates an extra-performance-guaranteed-environment determination event (in step ST1), and then ends the processing.

Figure 8:
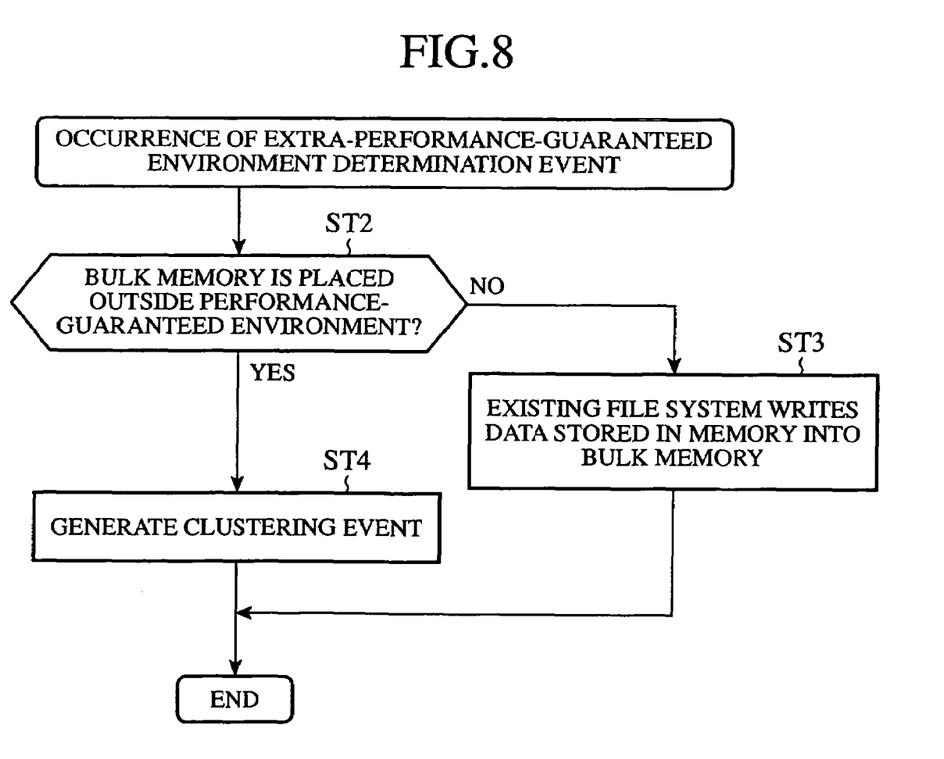
FIG. 8 is a flow chart showing processing which is carried out by the information storage system in accordance with embodiment 1 of the present invention when an extra-performance-guaranteed environment determination event occurs.

FIG. 8 is a flow chart showing processing which is carried out by the information storage system when an extra-performance-guaranteed-environment determination event occurs. When an extra-performance-guaranteed-environment determination event occurs, the performance-guaranteed environment determination means 11 of the host device 1 checks to see whether or not the current environment of the bulk memory is outside the performance-guaranteed environment (in step ST2). To be more specific, the performance-guaranteed environment determination means 11 checks to see whether or not the current environment of the bulk memory is outside the performance-guaranteed environment in which the performance of the bulk memory 3 is guaranteed by the manufacturer based on signals from a temperature sensor, a humidity sensor, a G (acceleration) sensor, etc. not shown.

When the performance-guaranteed environment determination means, in this step ST2, determines that the current environment of the bulk memory is not outside the performance-guaranteed environment, that is, the current environment is inside the performance-guaranteed environment, an existing file system that manages files stored in the bulk memory 3 writes the data stored in the memory 2 into the bulk memory 3, like that of a related art information storage system (in step ST3). On the other hand, when, in above-mentioned step ST2, determining that the current environment of the bulk memory is outside the performance-guaranteed environment, the performance-guaranteed environment determination means 11 generates a clustering event (in step ST4). The information storage system then ends the processing for the extra-performance-guaranteed-environment determination event.

Figure 9:
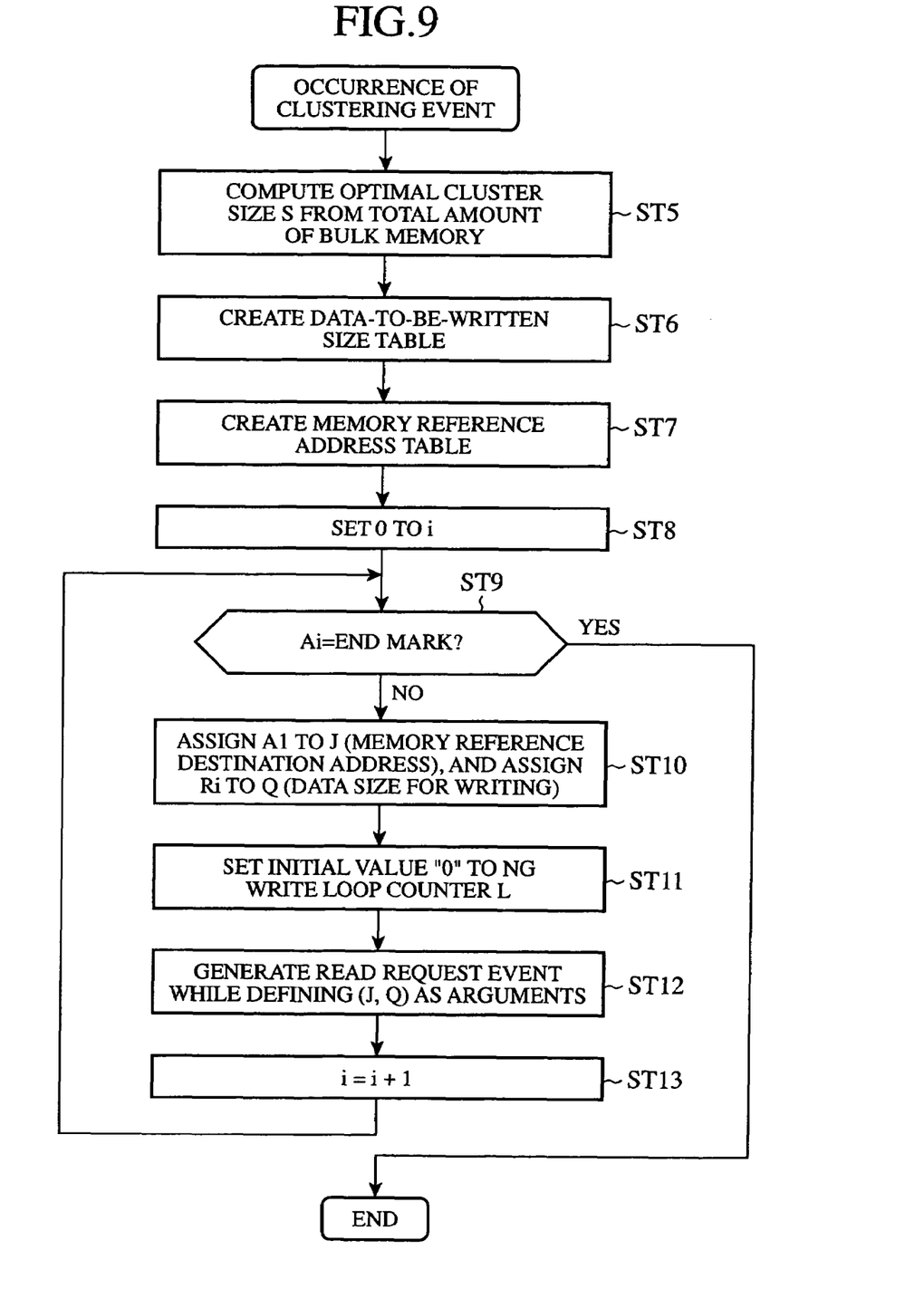
FIG. 9 is a flow chart showing processing which is carried out by the information storage system in accordance with embodiment 1 of the present invention when a clustering event occurs.

FIG. 9 is a flow chart showing processing which is carried out by the information storage system when a clustering event occurs. When a clustering event occurs, the clustering size computation means 12 of the host device 1 carries out the following processing. In other words, the clustering size computation means 12 computes the optimal cluster size S from the total amount of storage of the bulk memory 3 first (in step ST5). The clustering size computation means then creates the data-to-be-written size table Rk (in step ST6). To be more specific, the clustering size computation means 12 computes a quotient by dividing the size D of the data area in which the data are to be written by the optimal cluster size S, and sets the quotient to n. The clustering size computation means then writes the optimal cluster size S into each of R0 to Rn−1, and writes the remainder MOD into Rn. Thus, the host device creates the data-to-be-written size table Rk.

The clustering size computation means then creates the memory reference address table Ak (in step ST7). To be more specific, the clustering size computation means creates the memory reference address table Ak (k=0, 1, 2, . . . , n−1, n) based on the start address P of the data to be written and the data-to-be-written size table Rk. In this case, A0=P.

The clustering size computation means then sets "0" to a variable i as an initial value (in step ST8), and checks to see whether or not Ai is an END mark (in step ST9). When determining that Ai is an END mark, the clustering size computation means ends the processing for the clustering event. On the other hand, when determining that Ai is not an END mark, the clustering size computation means assigns Ai to a memory reference address J and also assigns Ri to a data size Q for writing (in step ST10). The clustering size computation means then sets "0" to an NG write loop counter L not shown as an initial value (in step ST11). The clustering size computation means then generates a read request event by defining the memory reference address J and the data size Q for writing as arguments (in step ST12). The clustering size computation means then adds "1" to the variable i (in step ST13). After that, the clustering size computation means returns the sequence to step ST9 in which it repeatedly carries out the above-mentioned processing.

Figure 10:
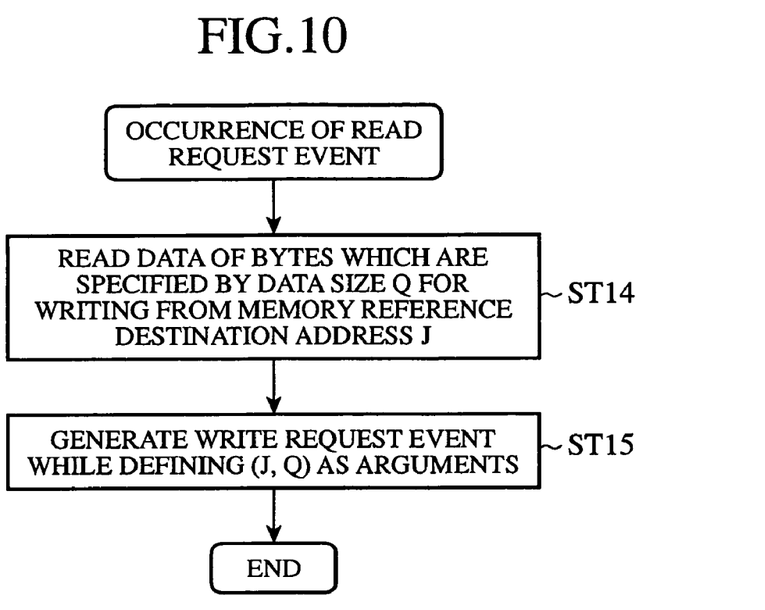
FIG. 10 is a flow chart showing processing which is carried out by the information storage system in accordance with embodiment 1 of the present invention when a read request event occurs.

FIG. 10 is a flow chart showing processing which is carried out by the information storage system when a read request event occurs. When a read request event occurs, the memory data reading means 13 of the host device 1 carries out the following processing. In other words, the memory data reading means 13 reads data of bytes which are specified by the data size Q for writing from a location of the memory 2 which is specified by the memory reference address J (in step ST14). The memory data reading means then generates a write request event by defining the memory reference address J and the data size Q for writing as arguments (in step ST15). After that, the memory data reading means ends the processing for the read request event.

Figure 11:
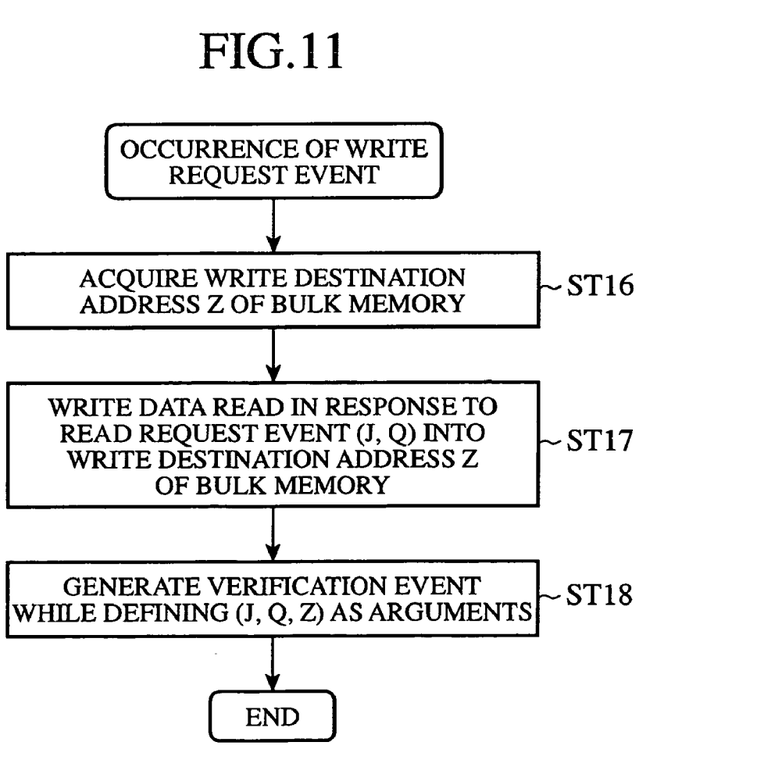
FIG. 11 is a flow chart showing processing which is carried out by the information storage system in accordance with embodiment 1 of the present invention when a write request event occurs.

FIG. 11 is a flowchart showing processing which is carried out by the information storage system when a write request event occurs. When a write request event occurs, the data writing means 14 of the host device 1 carries out the following processing. First, the data writing means 14 acquires a write destination address Z (in step ST16). To be more specific, the data writing means 14 calls the existing file system so as to make the existing file system refer to the NG table 10 and provide an address of the bulk memory 3 where the data can be written thereto. The data writing means assigns this address provided thereto to the write destination address Z of the bulk memory 3.

The data writing means then writes the data which it has read in response to the read request event having, as arguments, the memory reference address J and the data size Q for writing into an area which is specified by the write destination address Z of the bulk memory 3 (in step ST17). The data writing means then generates a verification event by defining the memory reference address J, the data size Q for writing, and the write destination address Z of the bulk memory 3 as arguments (in step ST18). After that, the data writing means ends the processing for the write request event.

Figure 12:
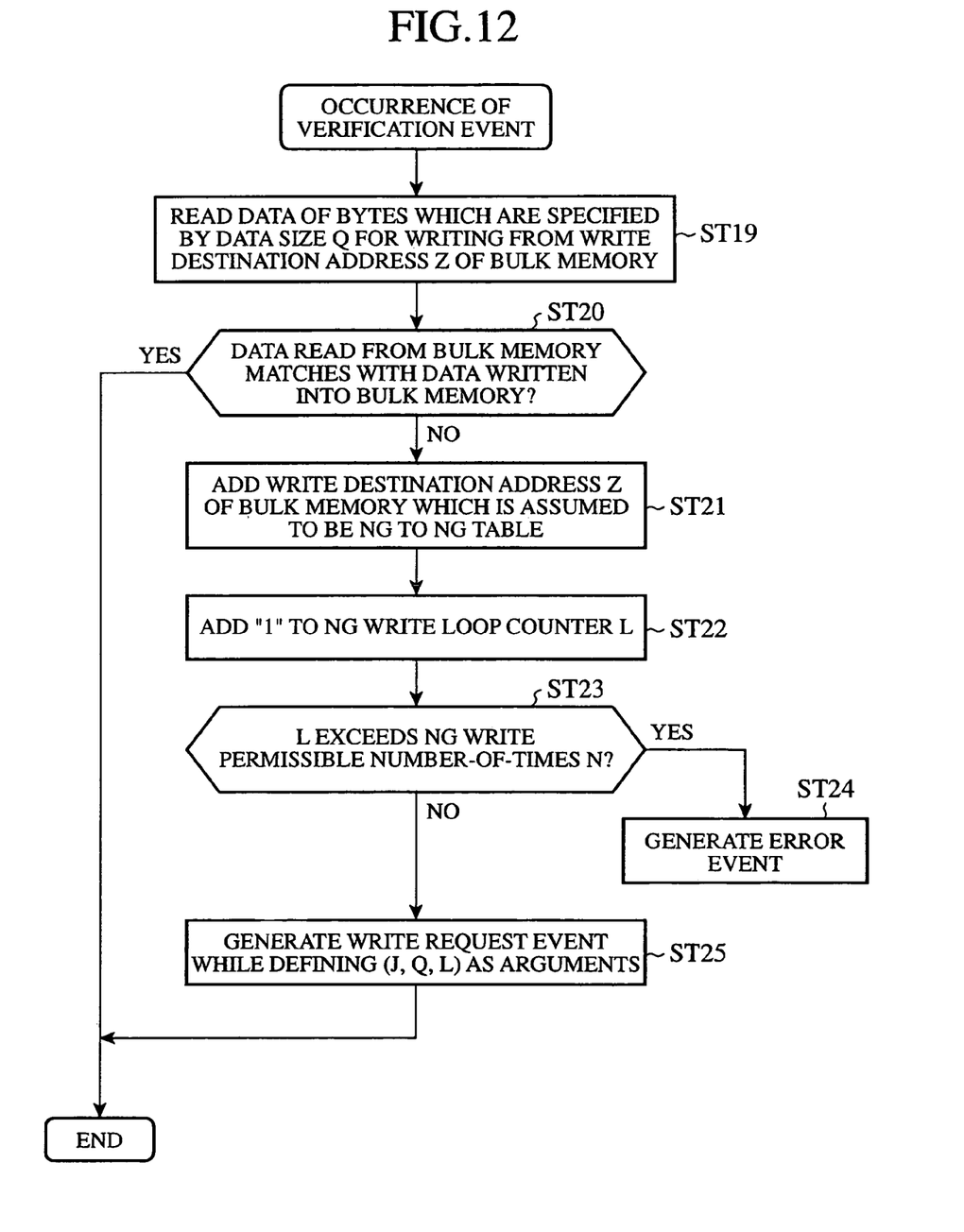
FIG. 12 is a flow chart showing processing which is carried out by the information storage system in accordance with embodiment 1 of the present invention when a verification event occurs.

FIG. 12 is a flow chart showing processing which is carried out by the information storage system when a verification event occurs. When a verification event occurs, the verification checking means 15 of the host device 1 carries out the following processing. First, the verification checking means 15 reads data of bytes which are specified by the data size Q for writing from the write destination address Z of the bulk memory 3 (in step ST19). The verification checking means then checks to see whether the data read in step ST19 match the data which have been read from the memory 2 in response to the above-mentioned read request event and have been written into the bulk memory 3 (in step ST20). When, in this step 20, determining that the data read in step ST19 match the data which have been written into the bulk memory, the verification checking means ends the processing for the verification event.

On the other hand, when, in step ST20, determining that the data read in step ST19 do not match the data which have been written into the bulk memory, the verification checking means adds the write destination address Z to the NG table 10 (in step ST21). To be more specific, the verification checking means writes a mark x indicating that data cannot be written into a corresponding location of the NG table 10, as shown in FIG. 6. The verification checking means then adds "1" to the NG write loop counter L (in step ST22). The verification checking means then checks to see whether the NG write loop counter L exceeds the NG write permissible number-of-times N (in step ST23). When determining that the NG write loop counter L exceeds the NG write permissible number-of-times N, the verification checking means generates an error event (step ST24). On the other hand, when determining that the NG write loop counter L does not exceed the NG write permissible number-of-times N, the verification checking means generates a write request event by defining the memory reference address J, the data size Q for writing, and the NG write loop counter L as arguments (in step ST25). After that, the verification checking means ends the processing for the verification event.

In the processing for the write request event generated in step ST25, since a mark x indicating that data cannot be written is written into a corresponding location of the NG table 10, the data are written into an area of the bulk memory 3 which is specified by another address. Therefore, the information storage system retries the writing of the data while changing the address of the bulk memory 3 one by one, and, when the number of times that the writing of the data is retried exceeds the NG write permissible number-of-times N, the information storage system recognizes that it is impossible to write the data into the bulk memory 3 and generates an error event.

Figure 13:
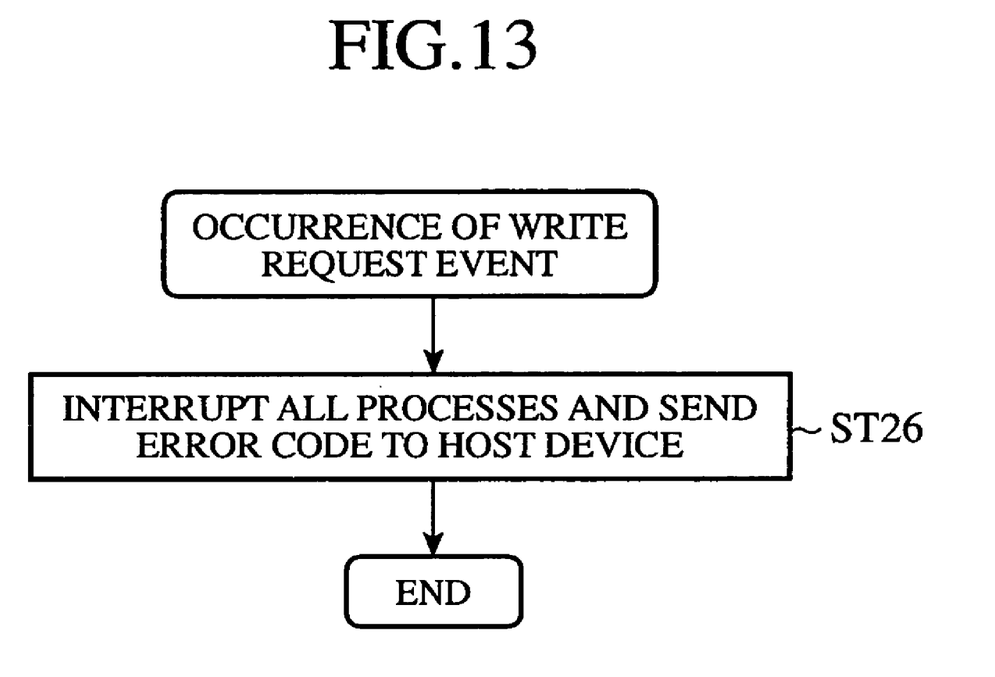
FIG. 13 is a flowchart showing processing which is carried out by the information storage system in accordance with embodiment 1 of the present invention when an error event occurs.

FIG. 13 is a flow chart showing processing which is carried out by the information storage system when an error event occurs. When an error event occurs, the verification checking means 15 interrupts all processes and hands over an error code to the host device 1 (in step ST26), and then ends the processing for the error event. Thereby, the host device 1 recognizes that an error has occurred when carrying out the verification checking, and then performs error processing.

In the case of storing the data to be written which are stored in the memory 2, as shown in FIG. 2, in the bulk memory 3, for example, when the NG table 10 in which information indicating that writing of data into specific areas is disabled is stored exists, as shown in FIG. 5, the information storage system writes the data to be written into a truck shown by a solid line while avoiding writing of the data into a truck shown by a dashed line, by carrying out the above-mentioned processes, as shown in FIG. 6.

As previously explained, the information storage system in accordance with embodiment 1 of the present invention includes the NG table 10 disposed in the host device 1, for storing the addresses of areas where data cannot be written, and, when performing writing of data into the bulk memory 3 which is placed outside the performance-guaranteed environment, writes the data in an area specified by an address other than the addresses of the areas where data cannot be written with reference to the NG table 10. Therefore, the host device 1 can write the data in the bulk memory 3 normally even if the current environment of the bulk memory 3 is outside the performance-guaranteed environment, and therefore the reliability of the information storage system can be improved.

Furthermore, the information storage system compares the data which have been written into the bulk memory 3 with the data acquired from the bulk memory 3, and, when the data which have been written into the bulk memory 3 do not match with the data acquired from the bulk memory 3, updates the NG table 10 by writing the address of the bulk memory 3 into which the data have been written into the NG table. Therefore, the information storage system can normally write data into the bulk memory 3 at all times.

In addition, the information storage system is so constructed as to carry out reading of data from the memory 2 and writing of the data into the bulk memory 3 on a cluster-by-cluster basis. Therefore, the information storage system can determine if a write error occurs before completing writing of all data to be written. As a result, since the information storage system can recognize whether or not the writing of the data into the bulk memory 3 results in success or failure at an early time, it can avoid useless writing operations from being repeatedly performed over a long time. Thereby, the information storage system can work efficiently.

INDUSTRIAL APPLICABILITY

As mentioned above, the information storage system in accordance with the present invention is suitable for normally writing data into a bulk memory even if the information storage system is placed outside a performance-guaranteed environment, to improve the reliability thereof.

The invention claimed is:

1. An information storage system provided with a bulk memory and a host device for controlling writing of data into said bulk memory, said host device comprising:
   an NG table for storing addresses of said bulk memory and information showing whether or not data can be written into an area of said bulk memory specified by an address;
   a performance-guaranteed environment determination means for determining whether or not a current environment of said bulk memory is outside a performance-guaranteed environment in which performance of said bulk memory is guaranteed; and
   a control means for writing data in an area of said bulk memory specified by a writable address of said NG table when said performance-guaranteed environment determination means determines that the current environment is outside the performance-guaranteed environment.

2. The information storage system according to claim 1, wherein said control means includes:
   an address acquisition means for acquiring the writable address of said NG table when said performance-guaranteed environment determination means determines that the current environment of said bulk memory is outside the performance-guaranteed environment;
   a data acquisition means for acquiring the data which are to be written into said bulk memory;
   a data writing means for writing the data acquired by said data acquisition means into the area of said bulk memory which is specified by the writable address acquired by said address acquisition means; and
   a verification checking means for comparing the data which have been written into the area by said data writing means with the data acquired by said data acquisition means, and for generating information in said NG table indicating that data cannot be written to the area of the bulk memory specified by the writable address acquired by said address acquisition means when determining that the data which have been written into the area does not match the data acquired by said data acquisition means.

3. The information storage system according to claim 2, wherein said address acquisition means makes a request of a file system that manages files stored in said bulk memory to acquire the writable address from said file system.

4. The information storage system according to claim 2, wherein said data acquisition means acquires the data from a memory on a cluster-by-cluster basis.

5. The information storage system according to claim 2, wherein if said verification checking means determines that the data which have been written into the area does not match the data acquired by said data acquisition means, the data writing means rewrites the data acquired by said data acquisition means into an area of said bulk memory which is specified by a different address.

6. The information storage system according to claim 5, wherein if a number of attempts to write the data acquired by said data acquisition means into said bulk memory exceeds a permissible number of times, the verification checking means generates an error event.

7. The information storage system according to claim 1, wherein information indicating the addresses specifying areas of said bulk memory into which data cannot be written is stored in said NG table if an attempt, by said control means, to write data in said areas is unsuccessful and wherein the host device is a separate device from the bulk memory.

8. A host device for controlling writing of data into a bulk memory, said host device comprising:
   an NG table for storing addresses of said bulk memory and information showing whether or not data can be written into an area of said bulk memory specified by an address;
   a performance-guaranteed environment determination circuit which determines whether or not a current environment of said bulk memory is outside a performance-guaranteed environment in which performance of said bulk memory is guaranteed; and
   a control circuit which writes data in an area of said bulk memory specified by a writable address of said NG table if said performance-guaranteed environment determination circuit determines that the current environment is outside the performance-guaranteed environment.

9. The host device according to claim 8, wherein said control circuit comprises:
an address acquisition circuit which acquires the writable address of said NG table if said performance-guaranteed environment determination circuit determines that the current environment of said bulk memory is outside the performance-guaranteed environment;
a data acquisition circuit which acquires the data which are to be written into said bulk memory, a data writing circuit which writes the data acquired by said data acquisition circuit into the area of said bulk memory which is specified by the writable address acquired by said address acquisition circuit; and
a verification checking circuit which compares the data which have been written into the area by said data writing circuit with the data acquired by said data acquisition circuit, and for generating information in said NG table indicating that data cannot be written to the area of the bulk memory specified by the writable address acquired by said address acquisition circuit in said NG table if determining that the data which have been written into the area does not match the data acquired by said data acquisition circuit.

10. The host device according to claim 9, wherein said address acquisition circuit makes a request of a file system that manages files stored in said bulk memory to acquire the writable address from said file system.

11. The host device according to claim 9, wherein said data acquisition circuit acquires the data from a memory on a cluster-by-cluster basis.

12. The host device according to claim 9, wherein if said verification checking circuit determines that the data which have been written into the area does not match the data acquired by said data acquisition circuit, the data writing circuit rewrites the data acquired by said data acquisition circuit into an area of said bulk memory which is specified by a different address.

13. The host device according to claim 12, wherein if a number of attempts to write the data acquired by said data acquisition circuit into said bulk memory exceeds a permissible number of times, the verification checking circuit generates an error event.

14. The host device according to claim 8, wherein information indicating the addresses specifying areas of said bulk memory into which data cannot be written is stored in said NG table if an attempt, by said control circuit, to write data in said areas is unsuccessful and wherein the host device is a separate device from the bulk memory.

* * * * *